United States Patent [19]

Huffman

[11] 4,387,459

[45] Jun. 7, 1983

[54] NON-BUFFERED LOOP-TIMED CHANNEL BANK

[75] Inventor: Charles E. Huffman, Plano, Tex.

[73] Assignee: Rockwell International Corporation, El Segundo, Calif.

[21] Appl. No.: 276,420

[22] Filed: Jun. 22, 1981

[51] Int. Cl.³ .............................................. H04J 3/06
[52] U.S. Cl. .................................................. 370/102
[58] Field of Search ...................... 370/100, 102, 112; 375/112

[56] References Cited

U.S. PATENT DOCUMENTS 4,025,720 5/1977 Pachynski, Jr. ..................... 370/102

FOREIGN PATENT DOCUMENTS 2751852 5/1979 Fed. Rep. of Germany ...... 370/102

OTHER PUBLICATIONS

"D448 PCM Trunk Carrier System", ITT Transmission Division, Raleigh, No. Carolina, Issue 2, 8/78, BRR-1-8-001.

Primary Examiner—Thomas A. Robinson
Attorney, Agent, or Firm—Michael E. Taken; V. Lawrence Sewell; Howard R. Greenberg

[57] ABSTRACT

In a digital transmission system, a loop-timing technique is provided for a channel bank which demultiplexes a high speed data stream into a plurality of lower rate channels, and which multiplexes a plurality of lower rate channels to a high speed data stream. Loop-timing is provided without elastic buffers by deriving stuff requests from stuff bits in the received high speed data stream, extracting a high speed clock signal from the received data stream, and applying the stuff requests and the high speed clock signal directly to the high speed multiplexer for providing stuff bits in the transmitted high speed data stream and for clocking the transmitted high speed data stream.

10 Claims, 10 Drawing Figures

PRIOR ART TRANSMISSION SYSTEM

FIG. 1

FIG. 2
PRIOR ART CHANNEL BANK

PRIOR ART
HIGH SPEED DEMULTIPLEXER
FIG. 4

PRIOR ART
HIGH SPEED MULTIPLEXER
FIG. 5

NON-BUFFERED LOOP-TIMED CHANNEL BANK

TECHNICAL FIELD

The invention relates to a channel bank in a digital transmission system for demultiplexing a high speed data stream into a plurality of lower rate channels, and for multiplexing a plurality of lower rate channels to a high speed data stream. The invention more particularly relates to an improved technique and system for loop-timing the demultiplexing and multiplexing operations without the use of elastic buffers. An exemplary application is telecommunication.

BACKGROUND

Digital transmission system channel banks are known in the art. In telecommunication for example, a channel bank may be located in a small city and interfaced via high speed data lines with a central station high capacity digital switch in a large city. The digital switch communicates with a plurality of outlying channel banks. The channel bank receives serial high speed data in a given framing format from the digital switch and demultiplexes the data into a plurality of channels which are sent to respective channel units which in turn may further demultiplex each channel for interfacing with the various telephone subscribers. The channel units also multiplex the inputs from the various telephone subscribers up to the higher channel rate, which channels are multiplexed by the channel bank up to a high speed serial data stream for transmission back to the central station digital switch.

The demultiplexing and multiplexing operations in the channel bank are loop-timed in order to provide synchronous end to end operation with the digital switch. This loop-timing is accomplished by the use of elastic buffers and by looping the respective extracted clock signals from the low speed channel unit demultiplexers to the low speed channel unit multiplexers. Elastic buffers are inserted between the high speed demultiplexer and the low speed demultiplexers to afford a smoothing function for deleted stuff bits. Another set of elastic buffers are inserted between the low speed multiplexers and the high speed multiplexer to absorb the delta frequency between the higher order and lower order multiplexers by enabling stuffing. Extracted clock signals are looped from the outputs of the low speed demultiplexers to the inputs of the low speed multiplexers.

In higher order channel banks, a need has arisen for circuit and space efficiency. For example, in a modular type system using card cage racks with printed circuit cards or panels inserted therein, the extra dedicated rack space required by the elastic buffer cards, and their part cost, is objectionable.

SUMMARY

The present invention provides an improved loop-timing technique in a digital transmission system channel bank. The loop-timing technique is simple and efficient, and eliminates the need for elastic buffers.

Stuff requests are derived from the stuff bits in the received high speed data stream. These stuff requests and the extracted high speed clock signal are sent directly to the high speed multiplexer for providing stuff bits in the transmitted high speed data stream and for clocking such data stream. A stuff requestor comprising a set of gates, one for each channel, responds to the stuff bit decoder and clock distribution circuitry of the high speed demultiplexer and generates stuff requests corresponding to the delta frequency between the high speed data stream and the demultiplexed channels. These stuff requests are applied directly to the high speed multiplexer for providing stuff commands thereto without elastic buffers. The extracted high speed clock signal from the high speed demultiplexer is applied directly to the high speed multiplexer for clocking the serial high speed data stream output therefrom.

BRIEF DESCRIPTION OF THE DRAWINGS

(a) Prior Art

FIGS. 1 through 7 illustrate background prior art.

(b) Present Invention

FIGS. 8 through 10 show the improved loop-timing system of the present invention.

DESCRIPTION OF BACKGROUND PRIOR ART

FIGS. 1 through 7 illustrate a digital transmission system and channel bank known in the art. The channel bank will be briefly described in order to facilitate understanding of the invention. The particular channel bank shown is a "Mode 4 PCM Channel Bank", for which further reference may be had to: "Transmission Systems for Communications" revised 4th Edition, Members of Technical Staff, Bell Telephone Laboratories, prepared for publication by Western Electric Co., Inc., Technical Publications, Winston Salem, N.C., 1971; and "D448 PCM Trunk Carrier System", ITT Transmission Division, Raleigh, N.C., Issue 2, 8/78, BRR-18-001.

Figure 1:
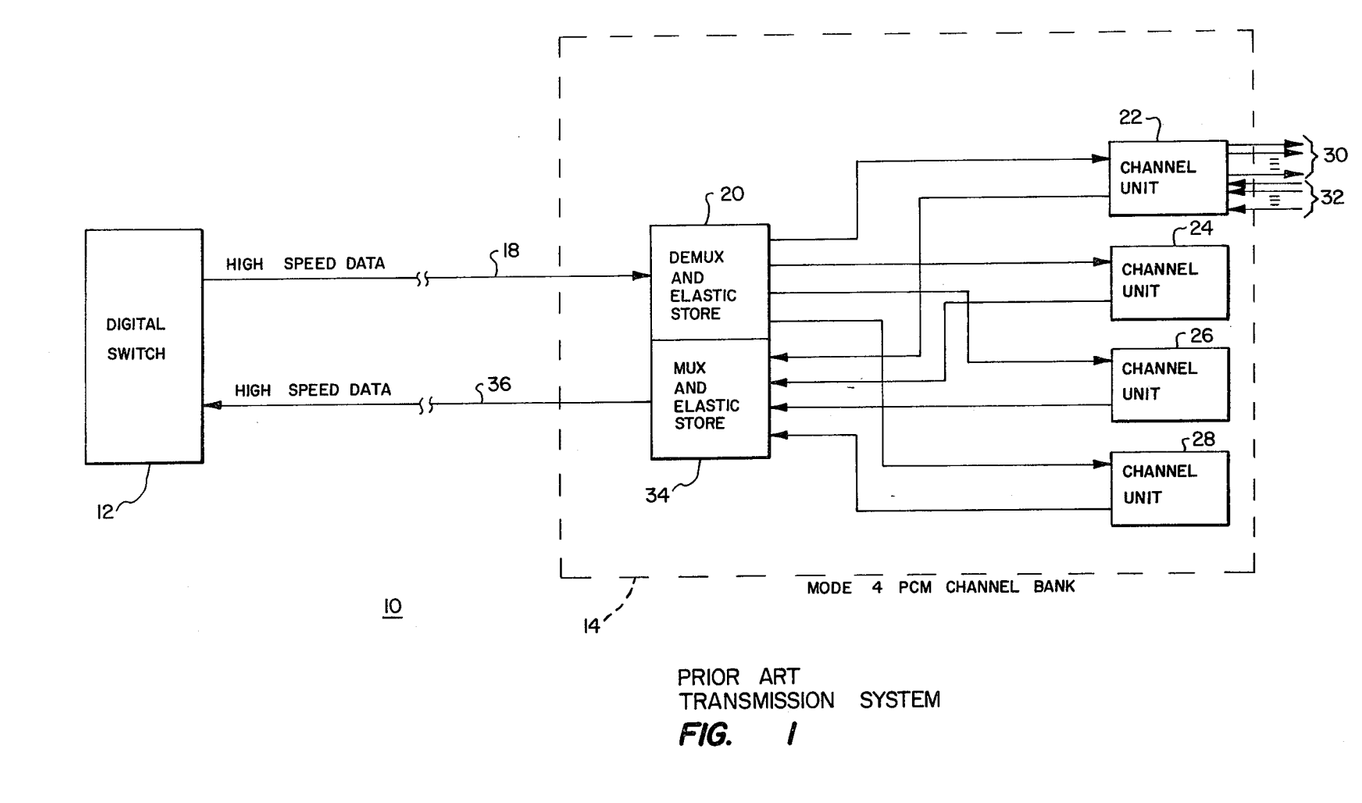
FIG. 1 is a schematic illustration of a digital transmission system with a central station digital switch at one end and a channel bank at the other end.

FIG. 1 shows a digital transmission system 10 including a high capacity digital switch 12 at a central switching location such as in a large city, and a channel bank 14 located in an outlying area or a smaller city. Digital switch 12 communicates with a plurality of outlying channel banks such as 14. Digital switch 12 includes multiplexing circuitry which receives a multiplicity of inputs from the various telephone subscribers and combines these inputs through one or more orders of multiplexing up to a high speed serial data stream, for example having a rate of 6.312 megabits per second. This high speed serial data stream is transmitted over a transmission medium 18, such as span line, microwave link, etc., to channel bank 14.

Channel bank 14 has demux and elastic store circuitry 20 for demultiplexing and elastically buffering the serial high speed data from line 18 into a plurality of lower speed channels, for example four channels at a 1.544 Mb/s rate. These four channels are sent to respective channel units 22, 24, 26 and 28, each of which may further demultiplex its respective channel into a plurality of lower speed lines each of which may be dedicated to a particular telephone subscriber; these dedicated telephone subscription lines are shown collectively at 30 for channel unit 22. Each channel unit also multiplexes various individual telephone subscription lines, collectively shown at 32 for channel unit 22, up to a higher speed channel, e.g., 1.544 Mb/s. This channel and the remaining channels are elastically buffered and multiplexed by mux and elastic store circuitry 34 which outputs a serial high speed data stream, e.g., 6.312 Mb/s, on transmission medium 36 back to digital switch 12.

Figure 2:
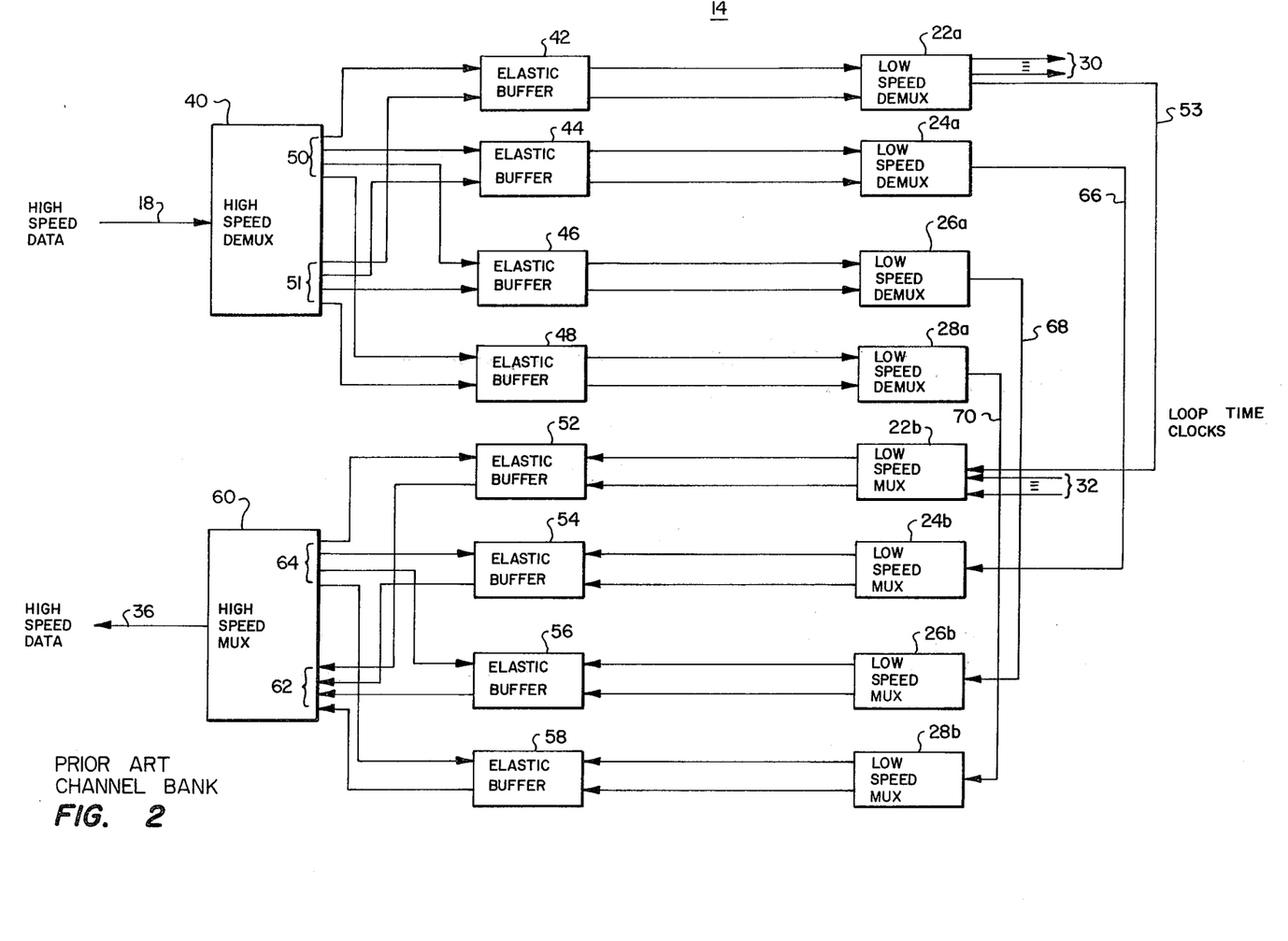
FIG. 2 schematically illustrates the demultiplexing and multiplexing operations in the channel bank of FIG. 1.

FIG. 2 shows channel bank 14 of FIG. 1. Demux and elastic store circuitry 20 of FIG. 1 includes a high speed demultiplexer 40 and a plurality of elastic buffers 42, 44, 46 and 48, one for each channel. The high speed serial data on line 18 is demultiplexed by demultiplexer 40 into four lower speed channels which are sent to the elastic buffers via data lines, collectively 50. A high speed clock signal is extracted from the high speed serial data on line 18 and demultiplexed into four lower speed clock signals, collectively 51, and sent to respective elastic buffers for clocking the data thereinto.

The rates of the high speed data on line 18 (6.312 Mb/s) and the lower speed data on each of the channels 50 (1.544 Mb/s) have a noninteger ratio, and thus the high speed data cannot be divided evenly into constituent channels. The remainder bits, less the overhead or frame format structure, are called stuff bits. High speed demultiplexer 40 removes these stuff bits from the data stream on line 18 by omitting a clock pulse on the appropriate clock line 51 such that the then current bit on correspondent data line 50 is not clocked into its correspondent elastic buffer. The elastic buffer smooths over this deleted bit.

FIG. 2 shows each channel unit divided into its demultiplexing and its multiplexing section, for example channel unit 22 has a demultiplexing section 22a and a multiplexing section 22b. Elastic buffer 42 outputs channel data and clock signals to low speed demultiplexer 22a which outputs to further demultiplexed subscriber lines 30. Low speed demultiplexer 22a also outputs a clock signal 53 which is looped back to low speed multiplexer 22b. Low speed multiplexer 22b multiplexes the various subscriber lines 32 up to channel speed (1.544 Mb/s) and delivers channel 1 data and clock signals to elastic buffer 52.

Mux and elastic store circuitry 34, FIG. 1, comprises elastic buffers 52, 54, 56 and 58, and high speed multiplexer 60. High speed multiplexer 60 multiplexes the 1.544 Mb/s channel data, collectively 62, up to a high speed serial data stream (6.312 Mb/s) output on transmission medium 36. High speed multiplexer 60 sends clock signals, collectively 64, to the elastic buffers for reading out the respective channel data. Channel data is loaded into the elastic buffer by the clock line from its respective low speed multiplexer, which is in turn timed by its respective loop-time clock 53, 66, 68 and 70.

Elastic buffers 52, 54, 56 and 58 compensate the delta frequency between the channel data rate (1.544 Mb/s) and the high speed transmission rate (6.312 Mb/s). This total delta frequency is the difference between the frequency of the high speed data stream and the sum of the channels less overhead. These elastic buffers enable the insertion of stuff bits by the high speed multiplexer 60, which stuffing supplies the remainder or delta frequency.

Figure 3:
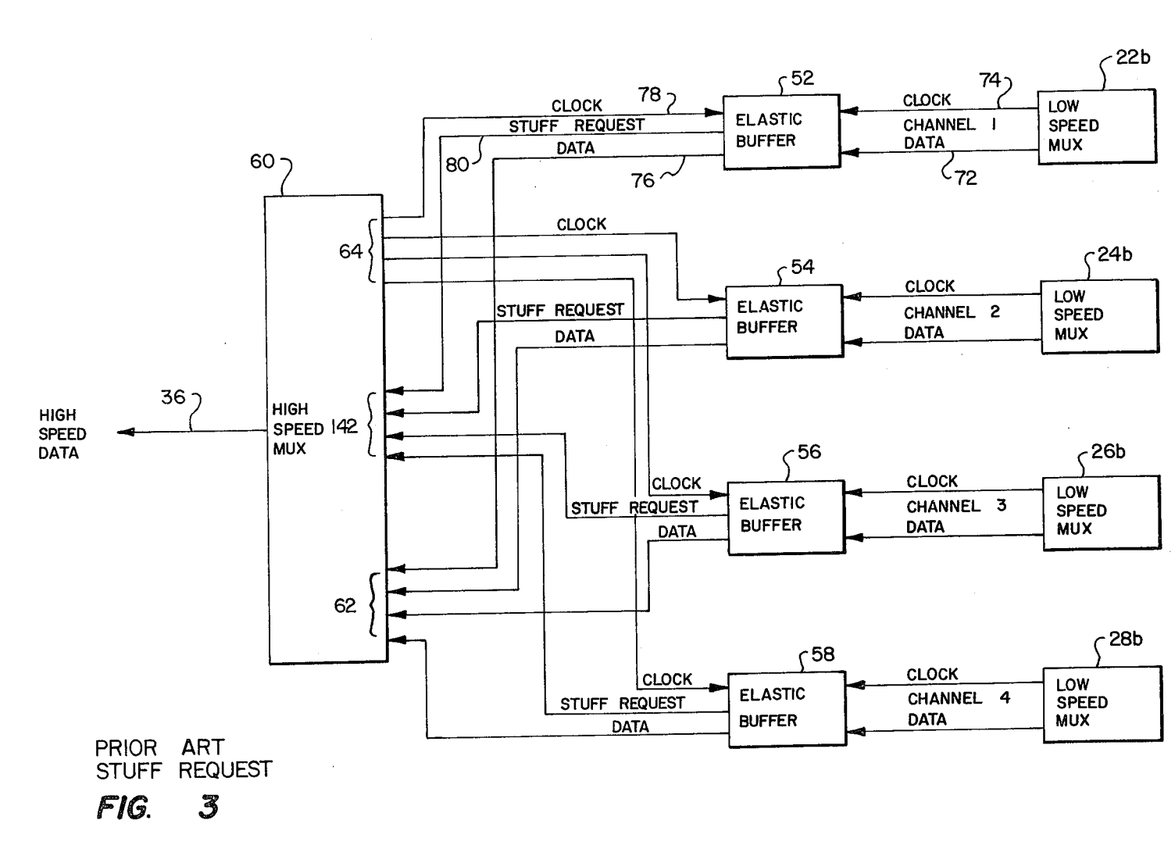
FIG. 3 schematically illustrates the stuff request command in the multiplexing operation of FIG. 2.

FIG. 3 shows the multiplexing operation of FIG. 2 and the stuff request technique of the prior art. Low speed channel unit multiplexer 22b sends channel 1 data on line 72 to elastic buffer 52. This data is clocked into elastic buffer 52 by the channel 1 clock signal on line 74. Channel 1 data is clocked out of elastic buffer 52 on data line 76 by the clock signal on line 78. The clock signal on line 78 has a slightly higher rate than the clock signal on line 74 such that data is read out of elastic buffer 52 slightly faster than data is read into elastic buffer 52.

Elastic buffer 52 may be a shift register or the like and when the data content therein drops below a given threshold, a signal is sent on stuff request line 80 to the high speed multiplexer 60. In response to the stuff command signal on line 80, high speed multiplexer 60 deletes or skips a clock pulse on line 78 such that no data bit is read out on line 76 during that deleted clock pulse interval. This allows the data content in elastic buffer 52 to stay above said given threshold level. During the skipped clock pulse interval on line 78, high speed multiplexer 60 inserts a dummy or stuff bit in the high speed serial data stream output on line 36. The remaining channels are comparable, and the frequency of the stuff request lines provides the delta frequency between the higher order multiplexer 60 and the lower order multiplexers 22b, 24b, 26b and 28b.

Figure 4:
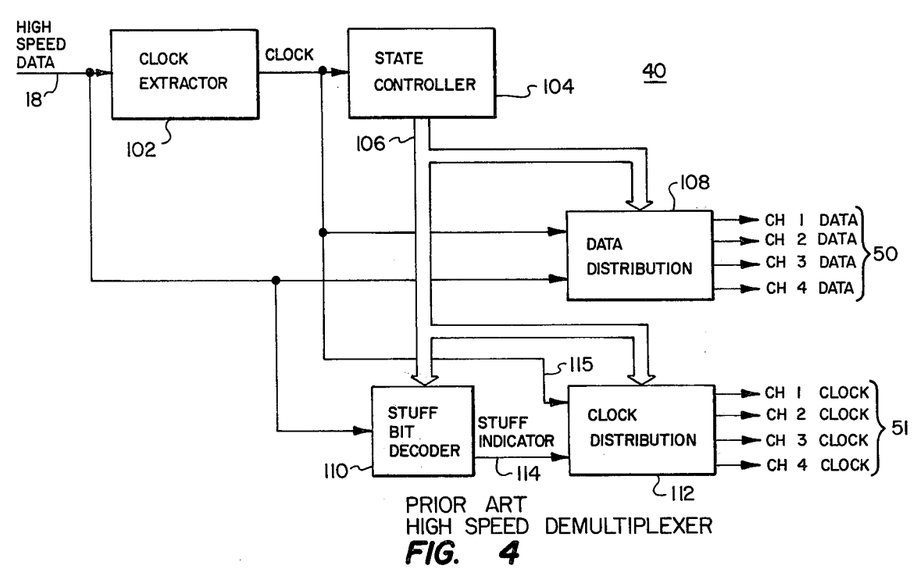
FIG. 4 schematically illustrates the high speed demultiplexer of FIG. 2.

FIG. 4 shows high speed demultiplexer 40 of FIG. 2. High speed serial data is received from line 18. A clock recovery or extraction circuit 102, such as a phase locked loop, extracts high speed clock signals from the high speed data. The extracted clock signals drive a state controller 104 which provides framing configuration identification on a bus 106 to data distribution circuit 108, stuff bit decoder 110 and clock distribution circuit 112 for controlling and timing the demultiplexing distribution operation by indicating which channel is currently appearing at the inputs thereto. The extracted clock signal and the data are delivered to data distribution circuit 108 for demultiplexing down to the channel data. The serial high speed data is also delivered to stuff bit decoder 110 which identifies and decodes the stuff bits to provide a stuff indicator signal on line 114 to clock distribution circuit 112. The extracted clock signal is delivered on line 115 to clock distribution circuit 112 which demultiplexes the high speed clock down to the channel clocks and which deletes correspondent clock signal pulses when a stuff indication signal is present on line 114. Channel data 50 and channel clocks 51 are sent to respective elastic buffers 42, 44, 46 and 48, FIG. 2.

Figure 5:
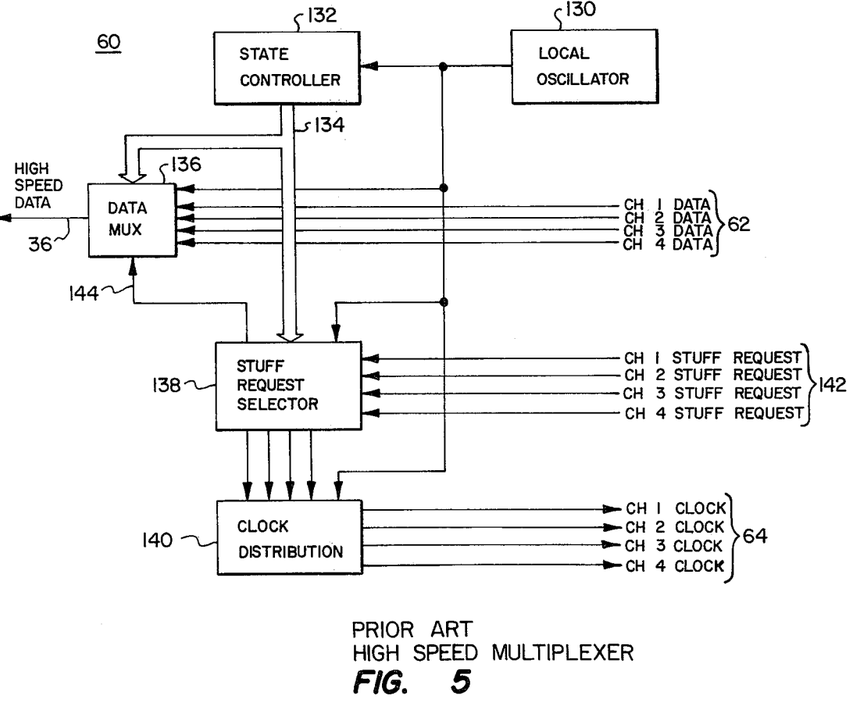
FIG. 5 schematically illustrates the high speed multiplexer of FIG. 2.

FIG. 5 shows high speed multiplexer 60 of FIGS. 2 and 3. A local oscillator 130 supplies clock signals to a state controller 132 which provides framing configuration and overhead structure on a bus 134 to data multiplexer 136 and stuff request selector 138. Channel data 62 from elastic buffers 52, 54, 56 and 58, FIG. 3, are input to multiplexer 136 for multiplexing up to the high speed serial data stream output on line 36 as clocked by high speed local oscillator 130. The high speed clock from oscillator 130 is delivered to a clock distribution circuit 140 which demultiplexes the high speed local oscillator clock into channel clocks 64 which read channel data 62 from elastic buffers 52, 54, 56 and 58. The stuff requests from these buffers, collectively 142, FIG. 3, are input to stuff request selector 138.

Stuff request selector 138 responds to a stuff request signal on any of lines 142 by issuing a stuff signal on line 144 to data multiplexer 136 which causes the insertion of a dummy or stuff bit in the output on line 36. Concurrently, stuff request selector 138 causes clock distribution circuit 140 to delete a clock pulse on the correspondent of the clock lines 64, to enable the correspondent elastic buffer contents to again fill above the minimum threshold, as above described. This skipped or deleted clock pulse on one of the lines 64 prevents data from being read out of the buffer on the correspondent one of the data lines 62 during that skipped clock pulse interval. The stuff signal on line 144 causes insertion of a dummy or stuff bit during this deleted clock pulse interval.

Figure 6:
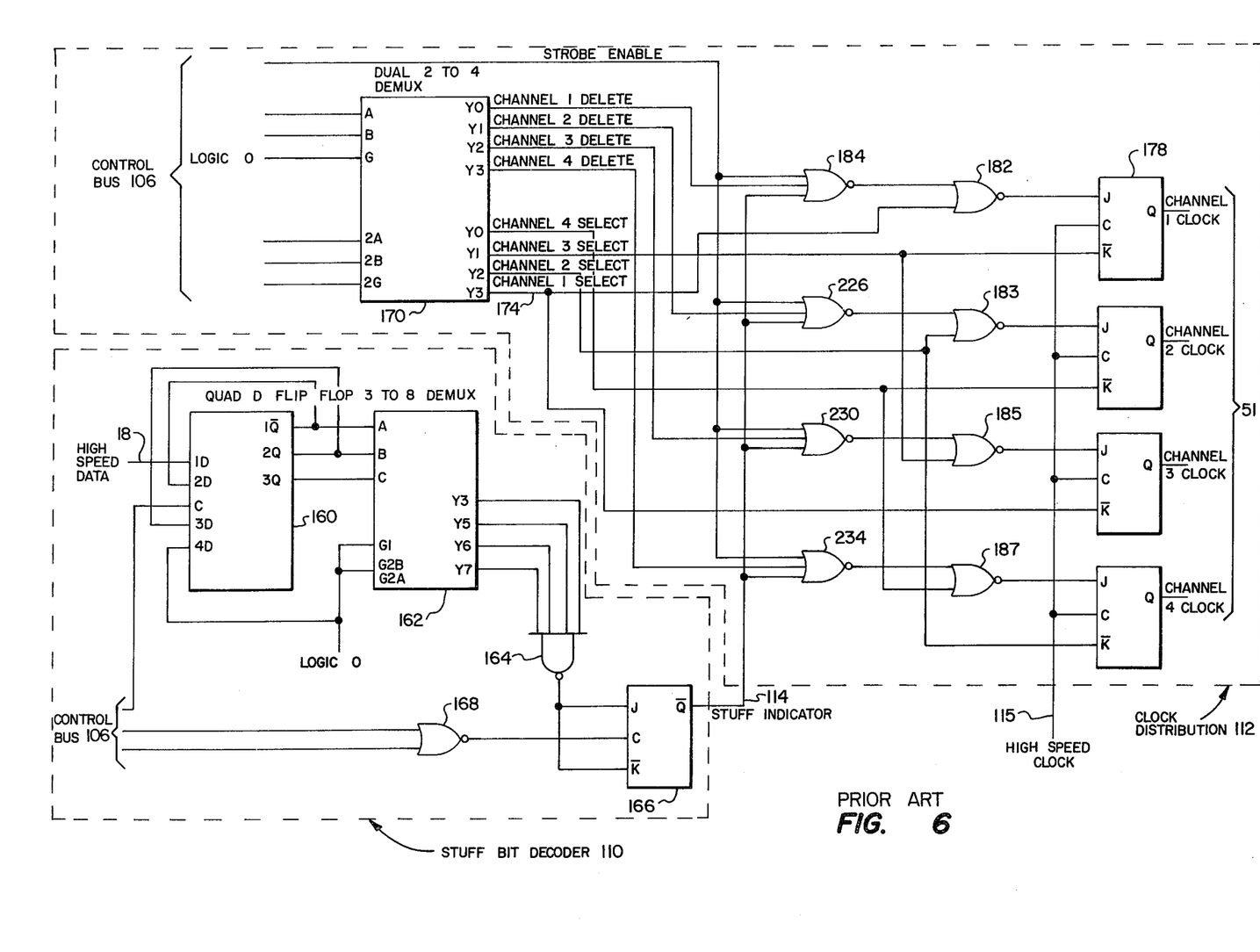
FIG. 6 is a circuit diagram of the stuff bit decoder and of the clock distribution circuitry of the high speed demultiplexer of FIG. 4.
Figure 7:
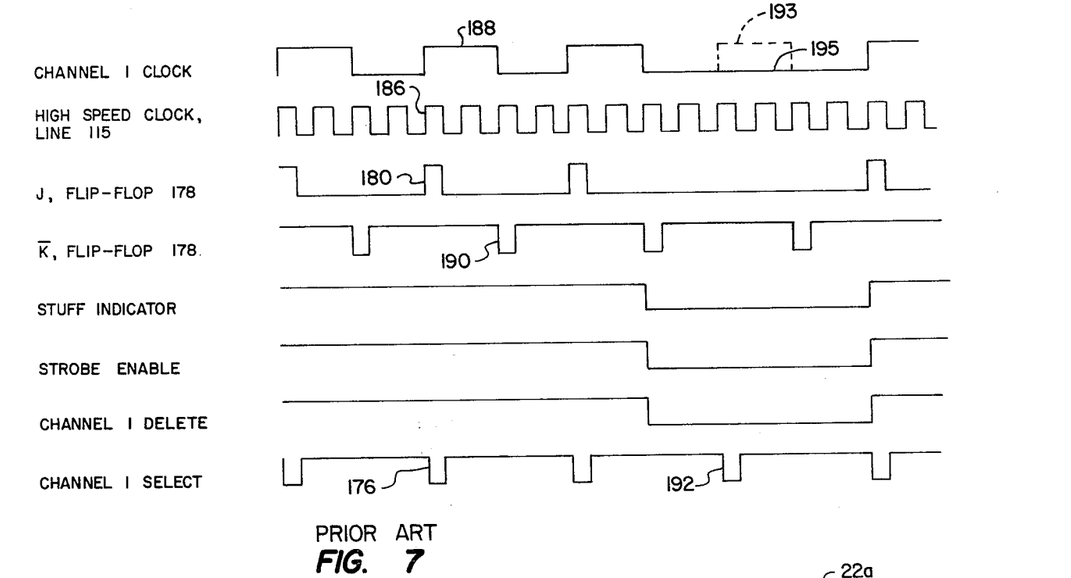
FIG. 7 is a timing diagram illustrating operation of the circuitry of FIG. 6.

FIG. 6 is a circuit diagram of stuff bit decoder 110 and clock distribution circuit 112 of FIG. 4. FIG. 7 is a timing diagram illustrating operation of the circuitry of FIG. 6. The standard catalog port designations for the components in FIG. 6 are shown for clarity.

The high speed serial data from line 18 is delivered to stuff bit decoder 110 and loaded into a quad D flip-flop 160, e.g. Texas Instruments 74LS175, by the leading edge of pulses supplied by the control bus 106 to the C input of flip-flop 160. Flip-flop 160 forms a serial-in parallel-out shift register into which the stuff code bits are loaded. The output of flip-flop 160 is decoded by a 3 to 8 demux 162, e.g. Texas Instruments 74LS138. In one particular implementation commonly used in the art, stuffing occurs if two or three out of the three A, B or C stuff code bits are at a logic one. Four outputs out of eight from the demux 162 indicate that a stuffing operation should take place. The output of NAND gate 164, which indicates stuffing, is stored in a JK flip-flop 166 when the latter's C input is pulsed from control bus 106 through NOR gate 168. The $\bar{Q}$ output of flip-flop 166 provides the stuff indicator signal on line 114.

Clock distribution circuitry 112 decodes control bus 106 by means of a dual 2 to 4 demux 170, e.g. Texas Instruments 74LS139, to indicate to the following logic circuitry which channel is being received. This determines which channel can be stuffed. The second section of demux 170 provides the channel clocks by the enabling channel selects which selectively gate the high speed clock from line 115.

Referring to channel 1 as an example, the channel 1 select signal on line 174 goes low at 176, FIG. 7, which in turn causes the J input to flip-flop 178 to go high at 180 because the other input to NOR gate 182 is also low due to the three inputs to NOR gate 184 being high. The high state 180 of the J input to flip-flop 178 is clocked through to the Q output by the positive clock transition 186 of the high speed clock on line 115. This positive transition of the Q output of flip-flop 178 provides the channel 1 clock signal pulse 188. Channel 1 clock signal pulse 188 is terminated by a different channel select signal from demux 170, causing the $\bar{K}$ input of flip-flop 178 to transition low at 190.

At channel 1 select signal transition 192, the J input to flip-flop 178 does not transition high because the other input to NOR gate 182 is high due to the low states of the channel 1 delete, strobe enable and stuff indicator inputs thereto. Since the J input to flip-flop 178 does not transition high, the Q output from flip-flop 178 stays low and hence the channel 1 clock signal pulse, otherwise shown in dashed line at 193, is instead deleted as shown by the solid line low state at 195.

DESCRIPTION OF THE INVENTION

Figure 8:
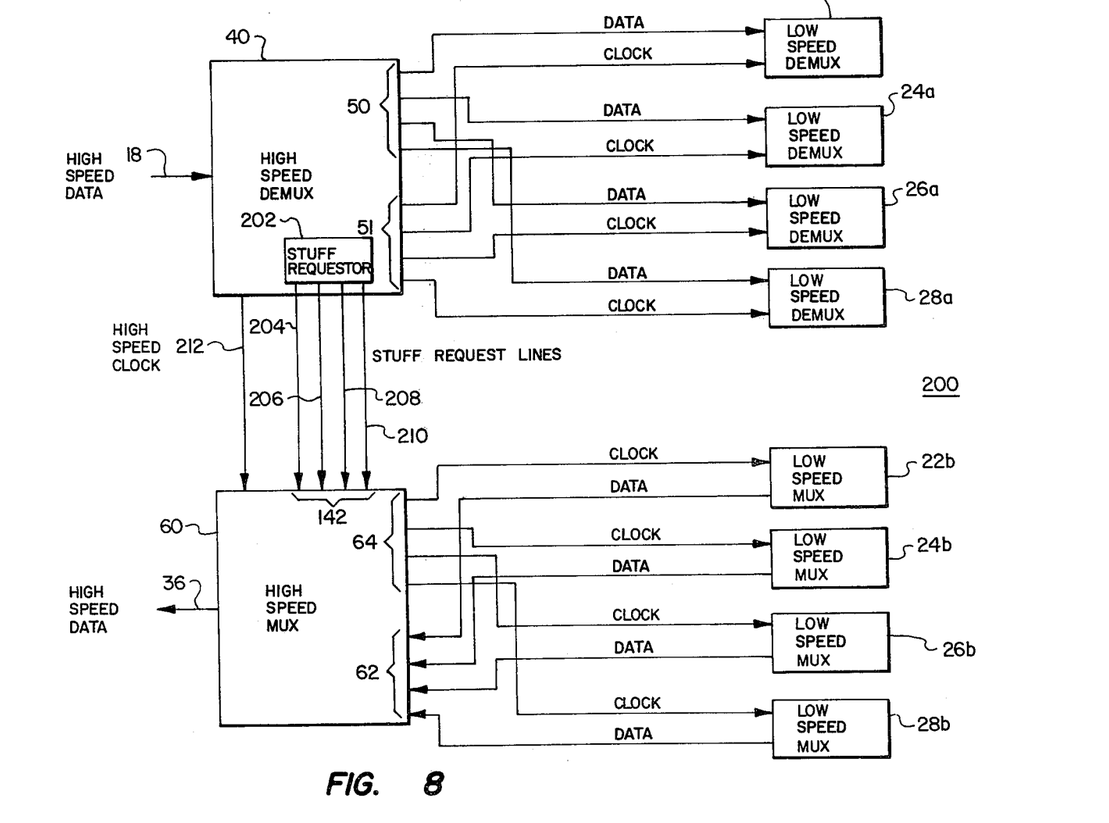
FIG. 8 schematically illustrates a bufferless channel bank loop-timing sytem in accordance with the invention.

FIG. 8 is a schematic illustration of a channel bank 200 constructed in accordance with the invention and employing the improved loop-timing technique of the invention. Contrasted against FIG. 2, the system in FIG. 8 eliminates elastic buffers 42, 44, 46 and 48, and elastic buffers 52, 54, 56 and 58, and loop-timing lines 53, 66, 68 and 70. Like reference characters are used in FIGS. 2 and 8 to designate common parts and facilitate understanding.

In FIG. 8, a stuff requestor 202 is added to high speed demultiplexer 40 and generates stuff commands on stuff request lines 204, 206, 208 and 210 which are sent together with the extracted high speed clock signal on line 212 directly across to the high speed multiplexer 60. Channel data 50 and channel clocks 51 are connected directly to the low speed demultiplexing sections 22a, 24a, 26a and 28a of the channel units, without intermediate elastic buffers. The high speed multiplexer 60 sends channel clocks 64 directly to the low speed multiplexing sections 22b, 24b, 26b and 28b of the channel units and reads the channel data 62 directly therefrom without intermediate elastic buffers. Delta frequency stuffing is provided by the stuff commands on stuff request lines 204, 206, 208 and 210 which provide the same function previously afforded by stuff request lines 142, FIG. 3.

Figure 9:
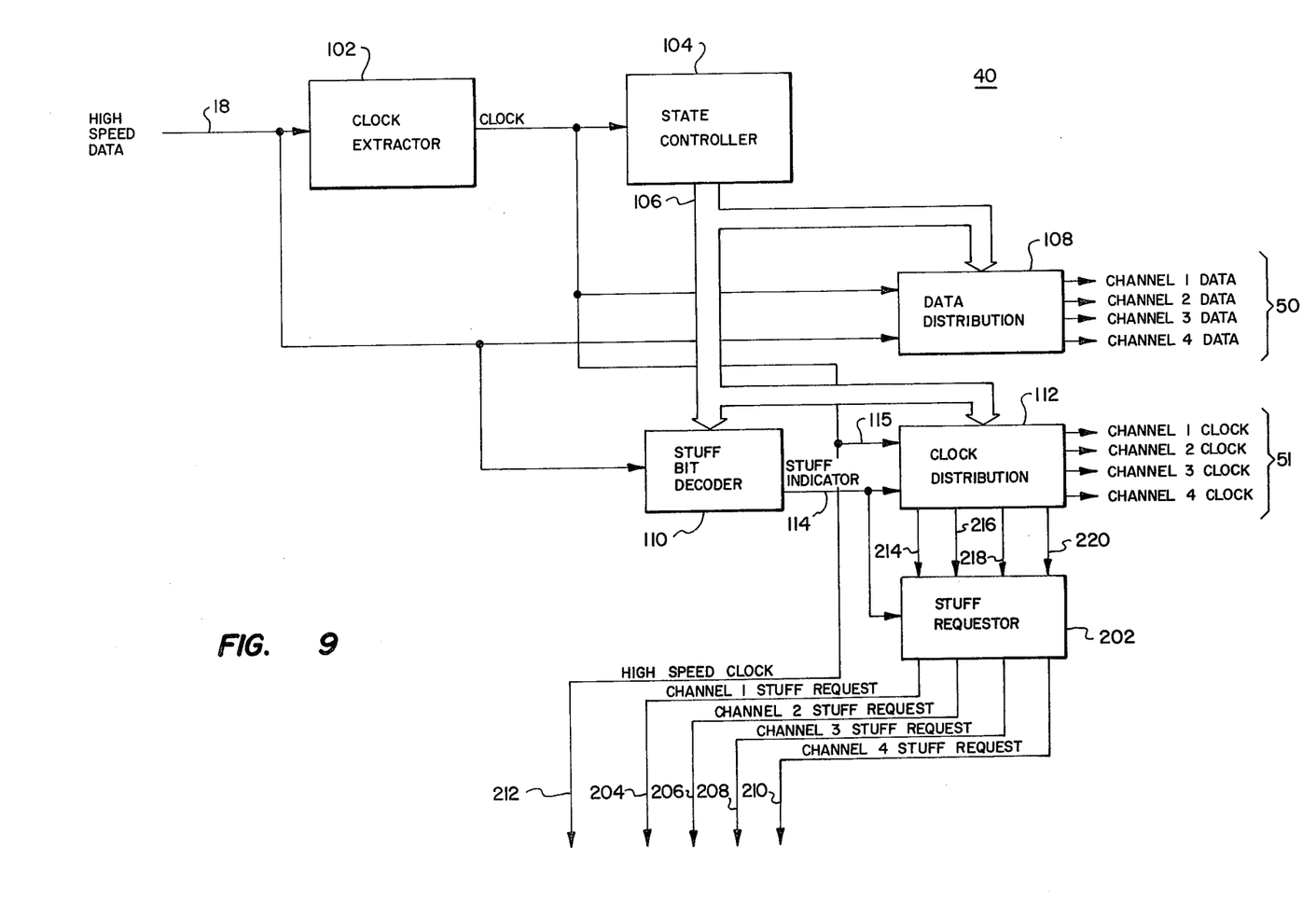
FIG. 9 schematically illustrates the high speed demultiplexer of FIG. 8.

FIG. 9 illustrates the high speed demultiplexer 40 and stuff requestor 202 of FIG. 8. FIG. 9 uses like reference characters as FIG. 4 for common components to facilitate understanding. The extracted high speed clock signal delivered to clock distribution circuit 112 at line 115 is also delivered on line 212 to the high speed multiplexer 60. Local oscillator 130, FIG. 5, is eliminated and the extracted high speed clock signal on line 212 substituted therefore. The stuff indicator signal output from stuff bit decoder 110, FIG. 9, on line 114 is delivered to clock distribution circuit 112 as in FIG. 4 and is also delivered to stuff requestor 202. Stuff requestor 202 has tap-off connection lines 214, 216, 218 and 220 connected to clock distribution circuit 112. The stuff indicator signal on line 114 gates signals from tap-off lines 214, 216, 218 and 220 through stuff requestor circuit 202 to generate stuff requests or commands on lines 204, 206, 208 and 210.

Figure 10:
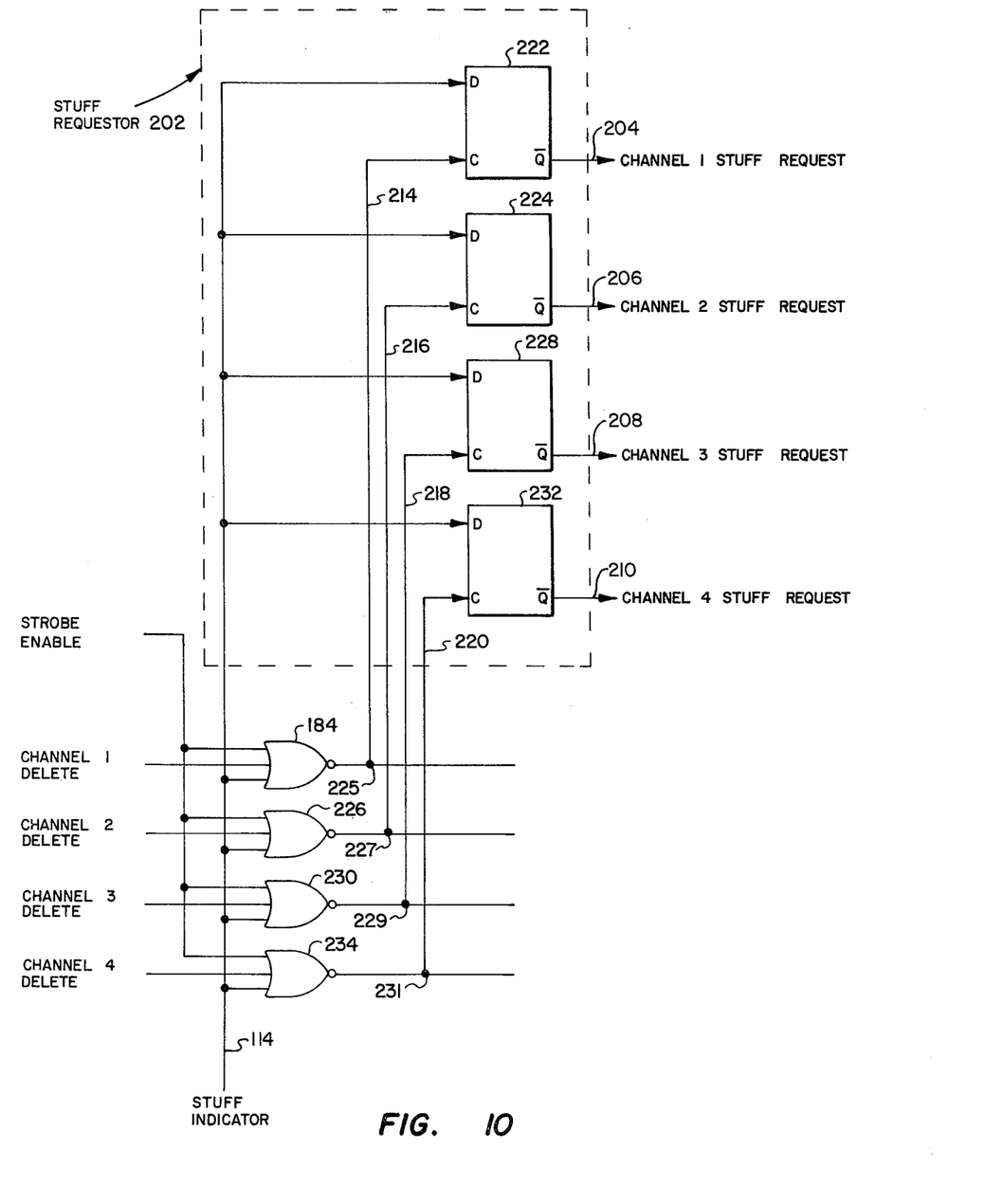
FIG. 10 is a circuit diagram of the stuff requestor of FIG. 9, and of a portion of the clock distribution circuitry of FIG. 9.

FIG. 10 is a circuit diagram of stuff requestor 202 of FIG. 9. Stuff requestor 202 comprises a plurality of conditional logic gates, one dedicated for each channel, for example a type D flip-flop. Channel 1 flip-flop 222 has its D input connected to stuff indicator line 114 and its C input connected by tap-off connection 214 to the output of NOR gate 184. Channel 2 flip-flop 224 has its D input connected to stuff indicator line 114 and its C input connected via tap-off connection 216 to the output of NOR gate 226. Channel 3 flip-flop 228 has its D input connected to stuff indicator line 114 and its C input connected via tap-off connection 218 to the output of NOR gate 230. Channel 4 flip-flop 232 has its D input connected to stuff indicator line 114 and its C input connected via tap-off connection 220 to the output of NOR gate 234. The $\overline{Q}$ outputs of flip-flops 222, 224, 228 and 232 provide stuff requests or commands on respective lines 204, 206, 208 and 210, which in turn provide the stuff request lines collectively designated 142 in FIG. 5. The channel stuff request or command lines 204, 206, 208 and 210 of FIG. 10 are connected to stuff request selector 138 of FIG. 5; and the channel bank high speed multiplexer 60 of FIGS. 5 and 8 functions as above described and as known in the art. The high speed multiplexer 60 does not know that the stuff requests 142 come from the high speed demultiplexer 40 rather than elastic buffers as in FIG. 3.

Considering channel 1 in the operation of stuff requestor 202 of FIG. 10, when the strobe enable, channel 1 delete and stuff indicator signals are all low then the output of NOR gate 184 will be high to thus provide a clocking signal on line 214 to flip-flop 222. This clocking signal at the C input to flip-flop 222 clocks in the low state on stuff indicator line 114 at the D input to thus cause the $\overline{Q}$ output on line 204 to go high, providing a stuff command to the high speed multiplexer 60.

Stuff requestor 202 is a simple and easily implementable addition to high speed demultiplexer 40, and eliminates the need for the numerous elastic buffers previously employed. Local oscillator 130, FIG. 5, is also eliminated.

The non-buffered improved loop-timing technique of the invention derives stuff requests from stuff bits in the received high speed data stream and extracts a high speed clock signal from the received high speed data stream, and applies these stuff requests and the extracted high speed clock signal directly to the multiplexing operation for providing stuff bits in the transmitted high speed data stream and for clocking the high speed data stream. The demultiplexing and multiplexing operations in the channel bank are thus loop-timed without the use of elastic buffers.

As seen in FIGS. 8 and 9, digital transmission system channel bank 200 has a high speed demultiplexer 40 demultiplexing a high speed data stream on line 18 into a plurality of lower rate channels 50 for delivery to respective receiving channel units 22a, 24a, 26a and 28a, and has a high speed multiplexer 60 for multiplexing a plurality of lower rate channels 62 from respective transmitting channel units 22b, 24b, 26b and 28b to a high speed data stream output on line 36. A high speed clock signal is extracted by circuit 102 from the received high speed data stream on line 18. Channel data from the high speed data stream on line 18 is distributed by data distribution circuitry 108. Channel clocks are distributed by clock distribution circuit 112 from the extracted high speed clock signal. Stuff bit decoder 110 decodes stuff bits in the high speed data stream and deletes correspondent pulses from the channel clocks 51. Channel data 50 and channel clocks 51 are delivered directly to the receiving channel units 22a, 24a, 26a and 28a without buffering of deleted pulses.

Stuff requestor 202 derives stuff requests from stuff bit decoder 110 and clock distribution circuit 112 and delivers these stuff requests on line 204, 206, 208 and 210, and the extracted high speed clock signal on line 212, directly to the high speed multiplexer 60. The extracted high speed clock signal on line 212 is substituted for local oscillator 130, FIG. 5, in the high speed multiplexer 60, and this extracted high speed clock signal on line 212 is distributed in the high speed multiplexer 60 by clock distribution circuit 140 to each of the transmitting channel units 22b, 24b, 26b and 28b for clocking channel data 62 therefrom directly to high speed multiplexer 60 without intermediate elastic buffering. The stuff requests or commands on lines 204, 206, 208 and 210, collectively 142 received in the high speed multiplexer 60, are applied to the clock distribution circuit 140 for deleting selected channel clock pulses in the channel clocks 64 to the transmitting channel units 22b, 24b, 26b and 28b, and for inserting stuff bits, triggered by the command on line 144, in the serial high speed data stream multiplexed from channel data 62 and output from mux 136 on line 36.

High speed demultiplexer 40 of channel bank 200 receives serial high speed data from line 18 and extracts a high speed clock signal therefrom, and distributes a plurality of lower rate data channels 50 and channel clocks 51, and includes stuff bit skipping means 110 and 112 for deleting stuff bits from the data stream. Receiving channel units 22a, 24a, 26a and 28a receive the respective data channels 50 and channel clocks 51 directly from the high speed demultiplexer 40 without intermediate elastic buffering. Transmitting channel units 22b, 24b, 26b and 28b transmit data channels 62 and may be separate from or unitary with correspondent receiving channel units 22a, 24a, 26a and 28a. High speed multiplexer 60 is clock driven by the extracted high speed clock signal on line 212 and distributes this high speed clock signal to lower rate channel clocks 64 directly input to the transmitting channel units 22b, 24b, 26b and 28b for clocking channel data 62 directly from these transmitting channel units to the high speed multiplexer 60 without intermediate elastic buffering and without loop-timing, e.g. 53, 66, 68 and 70 of FIG. 2, of receiving channel units to transmitting channel units. Stuff requestor means 202 responds to stuff bits skipping means 110 and 112 by generating stuff requests on lines 204, 206, 208, and 210 directly applied to high speed multiplexer 60 at a stuff request frequency corresponding to the delta frequency between the extracted high speed clock signal and the distributed channel clocks. Stuff bit decoder 110 identifies stuff bits in the high speed data stream and deletes correspondent clock pulses from channel clocks 51. Stuff requestor 202 responds to stuff bit decoder 110 and to clock distribution circuitry 112 for conditionally generating stuff requests.

Clock distribution circuit 112 includes selective logic circuitry for each channel. Stuff bit decoder 110 has a stuff indicator output signal on line 114 supplied to the selective logic circuitry for deleting a clock pulse in the selected channel. Stuff requestor 202 comprises a dedicated logic gate for each channel, each gate responsive to the stuff indicator signal and to the respective said selective logic circuitry. This selective logic circuitry of clock distribution circuit 112 includes a set of channel selection gates 182, 183, 185 and 187, FIG. 6, for determining output channel clock pulse distribution, and a set of channel deletion gates 184, 226, 230 and 234 for determining which channel is to have a clock pulse deleted in response to a stuff indicator signal on line 114 from stuff bit decoder 110. Channel selection gates 182, 183, 185 and 187 are conditionally responsive to channel deletion gates 184, 226, 230 and 234. Stuff requestor 202 is connected via tap-off connections 214, 216, 218 and 220 to points 225, 227, 229 and 231 between the channel deletion gates and the channel selection gates.

It is recognized that various modifications are possible within the scope of the appended claims.

I claim:

1. In a digital transmission system channel bank demultiplexing a high speed data stream into a plurality of lower rate channels, and multiplexing a plurality of lower rate channels to a high speed data stream, an improved technique for loop-timing said demultiplexing and multiplexing without the use of elastic buffers, comprising:
deriving stuff requests from stuff bits in the received high speed data stream;
extracting a high speed clock signal from said received data stream; and
applying said stuff requests and said high speed clock signal directly to said multiplexing for providing stuff bits in the transmitted high speed data stream and for clocking said transmitted high speed data stream.

2. In a digital transmission system channel bank having a high speed demultiplexer demultiplexing a high speed data stream into a plurality of lower rate channels for delivery to respective receiving channel units, and having a high speed multiplexer for multiplexing a plurality of lower rate channels from respective transmitting channel units to a high speed data stream, an improved technique for loop-timing the demultiplexing and multiplexing operations, comprising:
extracting a high speed clock signal from the received high speed data stream;
distributing channel data from said high speed data stream;
distributing channel clocks from said extracted high speed clock signal;
decoding stuff bits in said high speed data stream and deleting correspondent pulses from said channel clocks;
delivering said channel data and said channel clocks directly to said receiving channel units without buffering of deleted pulses;
deriving stuff requests from said stuff bit decoding and said clock distribution and delivering said stuff requests and said extracted high speed clock signal directly to said high speed multiplexer;
distributing said extracted high speed clock signal in said high speed multiplexer by means of clock distribution to each of said transmitting channel units for clocking channel data therefrom directly to said high speed multiplexer without intermediate elastic buffering; and
applying said stuff requests received in said high speed multiplexer to said clock distribution in said high speed multiplexer for deleting selected channel clock pulses to said transmitting channel units and for inserting stuff bits in said serial high speed data stream multiplexed from said channel data and output from said high speed multiplexer.

3. A digital transmission system channel bank comprising:
high speed demultiplexer means for receiving a serial high speed data stream and extracting a high speed clock signal therefrom, and distributing a plurality of lower rate data channels and channel clocks, and including stuff bit skipping means for deleting stuff bits from said data stream;
a plurality of receiving channel units for receiving respective said data channels and channel clocks directly from said high speed demultiplexer without intermediate elastic buffering;
a plurality of transmitting channel units for transmitting a plurality of channels of said lower rate data;
high speed multiplexer means, clock driven by said extracted high speed clock signal from said high speed demultiplexer means and distributing said high speed clock signal to a plurality of lower rate channel clocks directly input to said transmitting channel units for clocking channel data directly from said transmitting channel units to said high speed multiplexer means without intermediate elastic buffering and without loop-timing of said receiving channel units to said transmitting channel units; and
stuff requestor means responsive to said stuff bit skipping means in said high speed demultiplexer means for generating stuff requests on stuff request lines directly applied to said high speed multiplexer means at a stuff request frequency corresponding to the delta frequency between said extracted high speed clock signal and the distributed channel clocks.

4. The invention according to claim 3 wherein:
said high speed demultiplexer comprises:
clock recovery means for extracting said high speed clock signal from said high speed data stream;
state controller means for providing framing configuration identification; and
data distribution means for distributing channel data;
said stuff bit skipping means of said high speed demultiplexer means comprises:
clock distribution means providing said channel clocks; and
stuff bit decoder means for identifying stuff bits in said high speed data stream and deleting correspondent clock pulses from said channel clocks; and
said stuff requestor means responds to said stuff bit decoder means and said clock distribution means for conditionally generating said stuff requests.

5. The invention according to claim 4 wherein said high speed multiplexer means includes clock distribution means for distributing channel clocks from said extracted high speed clock signal received from said high speed demultiplexer means, and stuff request selector means responsive to said stuff requests from said high speed demultiplexer means for deleting selected clock pulses in said channel clocks output from said last mentioned clock distribution means and for inserting a stuff bit in the high speed data stream output from said multiplexed channel data to compensate for the correspondent non-clocked data bit from the correspondent transmitting channel unit due to the deleted channel clock pulse.

6. In a digital transmission system channel bank comprising:
(a) a demultiplexer for receiving a serial high speed data stream having a plurality of multiplexed channels in a predetermined framing configuration, said demultiplexer comprising:
clock recovery means for extracting a high speed clock signal from said data stream;
state controller means for providing framing configuration identification;
data distribution means for distributing channel data;
clock distribution means for providing channel clocks; and stuff bit decoder means for identifying stuff bits in said data stream and deleting correspondent pulses from said channel clocks; and (b) a multiplexer for receiving a plurality of channels and multiplexing same to a serial high speed data stream having said predetermined framing configuration;

an improved loop-timing system comprising:

stuff requestor means responsive to said demultiplexer for generating stuff requests corresponding to the delta frequency between said high speed data stream and said channels;

said extracted high speed clock signal and said stuff requests being sent directly to said multiplexer for clocking the serial high speed data stream output therefrom and for providing stuff commands thereto without elastic buffers.

7. The invention according to claim 6 wherein:

said clock distribution means includes selective logic circuitry for each channel;

said stuff bit decoder means has a stuff indicator output signal supplied to said selective logic circuitry for deleting a clock pulse in the selected channel; and said stuff requestor means of said improvement comprises a dedicated logic gate for each channel, each gate responsive to said stuff indicator signal and to respective said selective logic circuitry.

8. The invention according to claim 7 wherein said stuff requestor means comprises a flip-flop for each channel, each flip-flop having a D input supplied by said stuff indicator signal and a C input connected to respective said selective logic circuitry.

9. The invention according to claim 6 wherein said clock distribution means comprises a set of channel selection gates for determining output channel clock pulse distribution, and a set of channel deletion gates for determining which channel is to have a clock pulse deleted in response to a stuff indicator signal from said stuff bit decoder means, said channel selection gates being conditionally responsive to said channel deletion gates, and wherein said stuff requestor means is connected via tap-off connections to points between said channel deletion gates and said channel selection gates.

10. The invention according to claim 9 wherein said stuff requestor means comprises a dedicated logic gate for each channel, each gate having one input supplied by said stuff indicator signal from said stuff bit decoder means and another input supplied by a respective one of said tap-off connections.

* * * * *